United States Patent [19]

Kinoshita

[11] Patent Number: 4,505,020
[45] Date of Patent: Mar. 19, 1985

[54] TOOL REPLACING DEVICE

[75] Inventor: Mikio Kinoshita, Komaki, Japan

[73] Assignee: Okuma Machinery Works Ltd., Nagoya, Japan

[21] Appl. No.: 517,571

[22] Filed: Jul. 27, 1983

[30] Foreign Application Priority Data

Jul. 31, 1982 [JP] Japan ................. 57-135020

[51] Int. Cl.$^3$ ............................ B23Q 3/157
[52] U.S. Cl. ................. 29/568; 29/26 A; 414/736
[58] Field of Search ........... 29/568, 26 A, 426.3, 29/40; 414/736; 408/35

[56] References Cited

U.S. PATENT DOCUMENTS 3,466,740  9/1969  Harman ........................ 29/568
3,781,974  1/1974  Holzl et al. ................... 29/568

FOREIGN PATENT DOCUMENTS 0021543  7/1978  Japan ........................... 29/568
0163856  12/1981 Japan ........................... 29/568
0579934  12/1981 Japan ........................... 29/568

Primary Examiner—Z. R. Bilinsky
Attorney, Agent, or Firm—Bert J. Lewen

[57] ABSTRACT

An automatic tool replacing device for use in a machining center of the type equipped with a tool storage magazine having a linear portion in which a plurality of tools are arrayed in a row at a predetermined pitch. The tool replacing device has a turret having a plurality of tool holding sections and adapted to make an indexing rotation to bring any one of the tool holding sections to an index position adjacent to the linear portion. A plurality of tool grippers are attached to each of the tool holding sections of the turret and adapted to grip tools in such a manner that the axes of the gripped tools extend in the same direction as the axes of the tools stored in the linear portion of the tool storage magazine and that the axes of the gripped tools are spaced from adjacent ones by the same distance as that between adjacent tools stored in the linear portion of the tool storage magazine. The device further has a driving device adapted to cause a selective movement of the tool grippers in the tool holding section in the indexed position, in the direction of the axes of the gripped tools and in the direction perpendicular to the axes of the gripped tool towards and away from the linear portion of the tool storage magazine.

5 Claims, 7 Drawing Figures ived, in a machining center equipped with a tool storage magazine having a linear portion in which a plurality of tools are arrayed in a row at a predetermined pitch, and a tool exchanging arm by which the tool exchange is made between a machine tool and the magazine, a tool replacing device comprising: a turret having a plurality of tool holding sections and adapted to make an indexing rotation to bring any one of the tool holding sections to an index position adjacent to the linear portion; a plurality of tool grippers attached to each of the tool holding sections of the turret and adapted to grip tools in such a manner that the axes of the gripped tools extend in the same direction as the axes of the tools stored in the linear portion of the tool storage magazine and that the axes of the gripped tools are spaced from adjacent ones by the same distance as that between adjacent tools stored in the linear portion of the tool storage magazine; and a driving means adapted to cause a selective movement of the tool grippers in the tool holding section in the indexed position,

TOOL REPLACING DEVICE

BACKGROUND OF THE INVENTION

1. Field of the Invention

The present invention relates to a tool replacing device for replacing tools in a tool storage magazine of a machining center when the workpiece on the machine is changed.

2. Description of the Prior Art

Nowadays, machining centers of a large variety of size and capacity are available. Even a small-sized machining center may employ a large number of tools, e.g. more than several tens of tools, to be stored in the tool storage magazine, if the work to be performed requires a large number of kinds or steps of machining. On the other hand, large-size machining centers for handling large-size workpieces require tools the sizes and, hence, the weights of which are correspondingly large. Usually, the group of tools in the tool storage magazine includes tools which are used specifically for the workpiece on the machine and tools which can be used commonly for other types of workpiece. Therefore, when the workpiece on the machine is changed, it is necessary to replace these specific tools by new tools which are required for the machining of the new workpiece. The replacement is necessary also with the common tools, when they are worn too much or broken and when they need inspection or check. The replacing work does not burden the operator so much when the tool storage magazine is a small-sized drum type one capable of holding several tools at most. However, when the number of the tools is large or when the tools are heavy, the replacing work heavily burdens the operator and the operator often faces a danger. This is quite inconvenient from the view point of safety management. To obviate this problem, it has been proposed to replace the tools automatically by preparing a spare or auxiliary magazine with the assist by a robot. This proposal, however, is not preferred because of the necessity of a specific robot which is generally expensive.

SUMMARY OF THE INVENTION

Accordingly, it is a primary object of the invention to provide an economical and safe tool replacing device capable of performing the tool replacement in a shorter period of time to shorten the waiting time.

To this end, according to the invention, there is provided, in a machining center equipped with a tool storage magazine having a linear portion in which a plurality of tools are arrayed in a row at a predetermined pitch, and a tool exchanging arm by which the tool exchange is made between a machine tool and the magazine, a tool replacing device comprising: a turret having a plurality of tool holding sections and adapted to make an indexing rotation to bring any one of the tool holding sections to an index position adjacent to the linear portion; a plurality of tool grippers attached to each of the tool holding sections of the turret and adapted to grip tools in such a manner that the axes of the gripped tools extend in the same direction as the axes of the tools stored in the linear portion of the tool storage magazine and that the axes of the gripped tools are spaced from adjacent ones by the same distance as that between adjacent tools stored in the linear portion of the tool storage magazine; and a driving means adapted to cause a selective movement of the tool grippers in the tool holding section in the indexed position, in the direction of the axes of the gripped tools and in the direction perpendicular to the axes of the gripped tool towards and away from the linear portion of the tool storage magazine, thereby to effect a tool exchange between the tool grippers and the magazine.

The above and other objects, features and advantages of the invention will become more apparent from the following description of the preferred embodiments of the invention taken in conjunction with the accompanying drawings.

DESCRIPTION OF THE PREFERRED EMBODIMENTS

A first embodiment of the invention will be described hereinunder with reference to the attached drawings.

Figure 2:
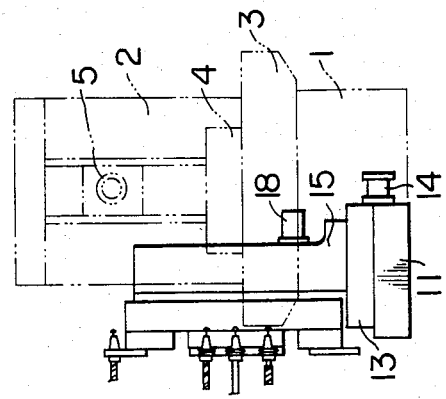
FIG. 2 is a side elevational view of the tool replacing device shown in FIG. 1.
Figure 1:
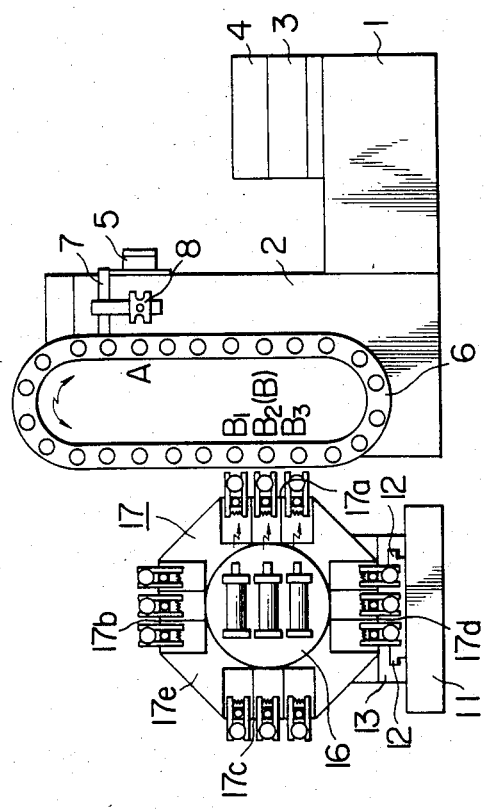
FIG. 1 is a front elevational view of a machining center having a first embodiment of the tool replacing device of the invention.
Figure 5:
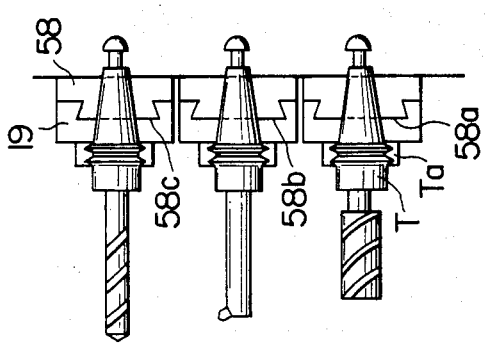
FIG. 5 is a view seen along the line V—V of FIG. 3.
Figure 3:
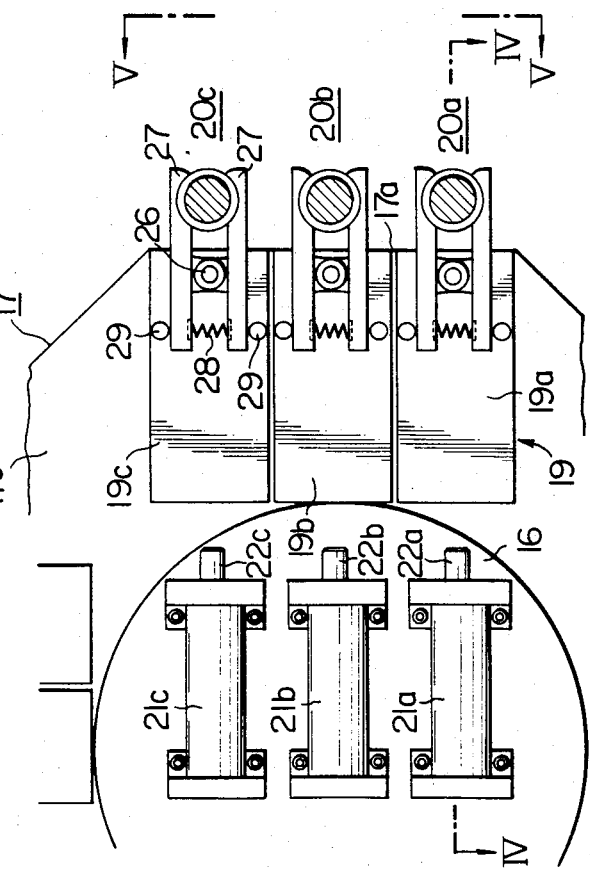
FIG. 3 is an enlarged front elevational view of a tool gripping member provided on one side of a turret in the first embodiment and of a driving device for the gripping member.

A machining center has a bed 1 to the rear side (left side as viewed in FIG. 1) of which attached is a vertical column 2. The bed 1 is provided on the upper side thereof with a horizontal guide surface perpendicular to the column 2. The horizontal guide surface slidably carries a saddle 3 the position of which is controlled by NC control through a ball screw (not shown) driven by a servomotor. The saddle 3 is provided on the upper side thereof with a horizontal guide surface which extends at a right angle to the direction of movement of the saddle. This horizontal guide surface slidably carries a table 4 the position of which is controlled by an NC control through a ball screw (not shown) driven by a servomotor. The column 2 rotatably carries a spindle 5 which extends horizontally towards the saddle 3. The spindle 5 is adapted to be moved in the vertical direction by means of a servomotor. The position of the spindle 5 is controlled by an NC control. A tool storage magazine 6 is disposed at one side of the column 2. The tool storage magazine 6 has a plurality of tool pots connected in an endless form having vertical stretches or linear portions. The tool pots are adapted to be selectively indexed at the tool exchange position A adjacent to the spindle 5 and a tool replacing position B opposite to the spindle 5 and including positions $B_1$, $B_2$, $B_3$. In each linear portion of the tool storage magazine 6, tools are arrayed in a row at a constant interval. A guide rail 7 is layed to extend between the tool exchanging position A and the position to which the spindle 5 is moved for the tool exchange. A automatic tool exchanging arm 8 slidably carried by the guide rail 7 is adapted to move between the tool exchanging position A and the spindle position to automatically exchange the tool in accordance with the instructions from an NC controller. The construction of the machining center explained hereinabove is well known and not novel.

An explanation will be given hereinunder as to the tool replacing device of the invention for replacing the tools in the tool storage magazine 6.

Figure 4:
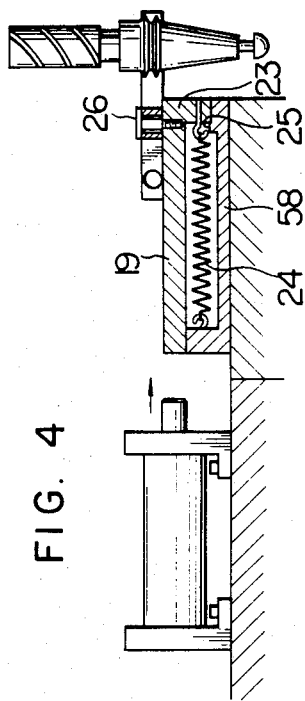
FIG. 4 is a sectional view taken along the line IV—IV of FIG. 3.

The tool replacing device of the invention has a base 11 on the upper side of which are formed horizontal guides 12 and 12 extending in parallel with each other. The guides 12 carries a movable bed 13 which is movable between two positions by the operation of a hydraulic cylinder or a combination of a feed screw and a motor. The movable bed 13 carries a turret base 15. A polygonal turret, octagonal in the illustrated embodiment, is carried by a free indexing rotation around a shaft 16 which extends horizontally in parallel with the direction of movement of the movable base 13. The indexing rotation is effected by an indexing motor 18. Every other sides 17a, 17b, 17c and 17d of the octagonal turrent, spaced 90° from adjacent ones, include tool holding sections. Each tool holding section has a plurality of guide surfaces which extends perpendicularly to the associated side 17a, 17b, 17c or 17d of the octagonal turret and in parallel with the front surface of the turret 17. In the illustrated embodiment, each tool holding section has three guide surfaces 58a, 58b and 58c extending perpendicular to the corresponding side 17a, 17b, 17c or 17d in a side-by-side fashion and at the same pitch as the tool pots in the tool storage magazine 6. The guide surfaces 58a, 58b and 58c slidably carries tool beds 19a, 19b and 19c. Tool grippers 20a, 20b and 20c are provided on the breadthwise centers of the tool beds such that the axes of the gripping extend in parallel with one another at the outer side of the side of the octagon, e.g. 17a. In other words, each tool gripper is adapted to grip a tool in such a manner that the axis of the gripped tool extends in the same direction or in parallel with the axes of the tools stored in the linear portions of the magazine. The tool beds 19a, 19b and 19c oppose at their rear ends to the ends of piston rods 22a, 22b and 22c of pistons received by hydraulic cylinders 21a, 21b and 21c provided on the end surface of the shaft 16 of the turret. These rods are adapted to move, when the hydraulic cylinders operate, in the directions of sliding of the tool beds 19a, 19b and 19c. A spring 24 is stretched between a lower projection 23 (see FIG. 4) on the front end of each tool bed and the rear end of the guide 58 so as to normally bias the tool bed in the retracting direction. The rearward stroke of the tool bed is limited by the abutment between the projection 23 and a stopper 23 on the front end of the guide 58.

The arrangement is such that, when the piston rods of the hydraulic cylinders 21a, 21b and 21c are fully extended to the forward stroke ends, the gripping axes of the tool grippers 20a, 20b and 20c coincide with the axes of the tools in the corresponding tool replacing positions $B_3$, $B_2$, $B_1$. On the other hand, when the piston rods are fully moved to the ends of the rearward stroke, the ends of the piston rods are retracted to positions spaced from the rear ends of the tool beds 19 so as not to interfere with the turret 17 during the rotation of the latter. The tool gripper includes a pair of symmetric gripping members 27 having V-shaped gripping portions at their ends and provided at their rear ends with spring retainers, while being supported at their longitudinal mid portions by a small shaft 26 provided on the tool bed 19. The V-shaped gripping portions are adapted to fit a gripper clamper Ta of the tool exchanging arm 8 of the tool holder T. A spring 28 acting between the spring retainers of both gripping members 27 acts to urge the gripping members 27 rotationally such that the gripping portions of the gripping members get closer to each other. The clearance between the gripping ends of the gripping members is optimized for the receiving of the gripper clamper Ta, by the adjustment of stopper pins 29 acting on the outer surfaces of the rear ends of the gripping members 27.

The tool replacing device having the described construction, if it is of a stationary type, is situated at a predetermined distance from the tool storage magazine 6 such that the direction of movement of the movable bed 13 is in parallel with the axes of the tools in the magazine 6, thereby to permit the indexing of the turret 17 for the replacement of the tools in the rear linear portion of the magazine 6. If the tool exchanging device is of mobile type having wheels at the lower side of the base and a suitable wheel driving device, the tool replacing device is provided with a positioning means for positioning the device in a predetermined relation to the tool storage magazine 6.

The operation of the tool replacing device of the stationary type, by way of example, will be explained hereinunder. Assume here that all of three tool grippers 20a, 20b and 20c in each of three sides 17a, 17b and 17c on the front surface 17e of the turret 17 grip and hold specific tools necessary for the next machining, while three tool grippers on the remainder side 17d are vacant. Then, as the machining on the same type of workpieces is completed, an tool replacing command is issued by an NC controller so that the tool storage magazine 6 is operated to index these specific tools at the replacing position B, while the turret is indexed by the motor 18 to bring the side 17d of the turret 17 carrying the vacant tool grippers. Then, hydraulic pressure is applied to three hydraulic cylinders 21a, 21b and 21c so that the piston rods 22a, 22b and 22c of respective cylinders push the rear ends of the tool beds 19a, 19b and 19c thereby to move the latter forwardly. Just before the tool beds reach their forward stroke ends, the forward ends of the gripping members of each of the tool grippers 20a, 20b and 20c are forcibly moved away from each other by the clamping groove Ta of the tool holder T in the magazine 6 thereby to receive and hold the tool holder T. Then, the drive cylinder 14 for the movable bed 13 is supplied with pressurized fluid to move the tools in the axial direction together with the turret 17, thereby to extract the tools from the pot. Then, the cylinders 21a, 21b and 21c are supplied with pressurized fluid to retract their piston rods 22a, 22b and 22c, and the tool beds 19a, 19b and 19c are retracted by the force of the springs 24 until they are positioned at the rearward stroke ends by the abutment between the stoppers 25 on the guide 58 and the projections 23. Meanwhile, the piston rods move away from the tool beds so as not to hinder the rotation of the turret 17 at the stroke ends.

Subsequently, the turret 17 is rotated clockwise by the motor 18 to bring the side 17a of the turret to the replacing position. Thereafter, the cylinders 21a, 21b and 21c are spplied with the pressurized fluid to extend their piston rods 22a, 22b and 22c to push the tool beds 19a, 19b and 19c so that the tools for replacement gripped by the tool grippers 20a, 20b and 20c are moved in the direction perpendicular to the axes of these tools towards the magazine 6 and are located on the axes of the tool pots in the magazine 6 which are now vacant.

The tools are then moved into the tool pots by the movement of the movable bed 13 in the tool axes direction caused by the cylinder 14. Then, the cylinders 21a, 21b and 21c operate to retract their piston rods 22a, 22b and 22c and the tool beds 19a, 19b and 19c are moved backward by the force of the springs 24 until they are located at the retracted position where the projections 23 abut the stoppers 25. Thus, the old specific tools on the tool storage magazine 6 are replaced with the new specific tools which are extracted from the turret as they are required in the next machining.

The tool replacing device of the invention is usable also for replacing the tools which are not specific but usable commonly in different machining operations, when these common tools have been worn too much. The operation of the tool replacing device for such a purpose will be explained hereinunder. Assume here that the tool grippers 20a, 20b and 20c on the side 17c carry new common tools. The tool grippers 20a, 20b and 20c correspond, respectively, to the positions $B_1$, $B_2$ and $B_3$ of the tool replacing position B. Therefore, informations as to the what tool is received by each of three tool grippers in the side 17c are stored in the NC controller which in turn issues a command as to at which one of the three positions $B_1$, $B_2$ and $B_3$ the tool on the magazine to be renewed. Then, the magazine 6 and the turret 17 are indexed and two or one of the cylinders 21a to 21c is operated to replace two or one tool with new one.

Figure 7:
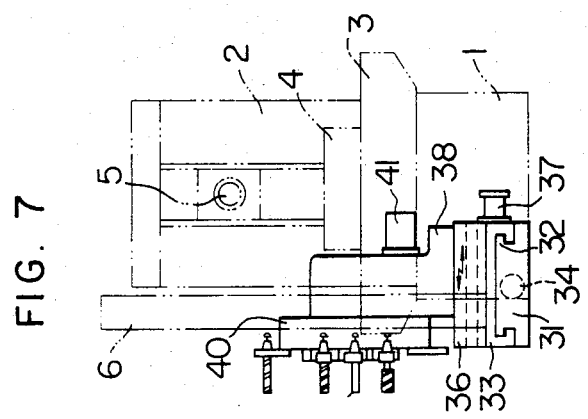
FIG. 7 is a side elevational view of the tool replacing device shown in FIG. 6.
Figure 6:
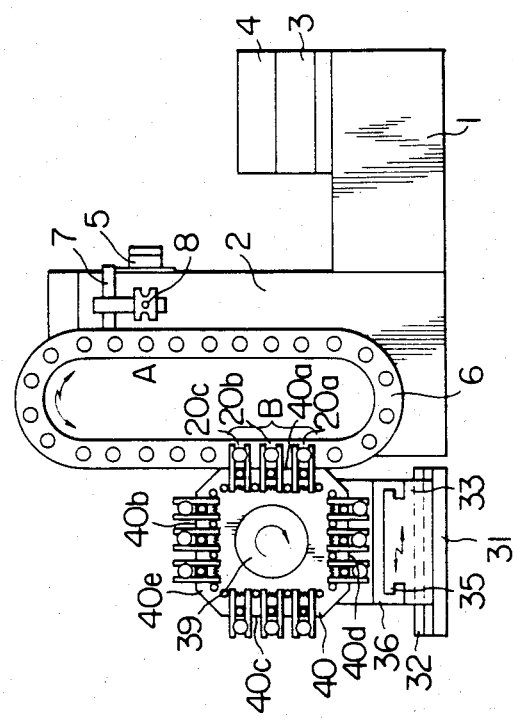
FIG. 6 is a front elevational view of a machining center having a second embodiment of the tool replacing device of the invention.

A second embodiment of the invention will be described hereinunder with reference to FIGS. 6 and 7 in which the sections or parts such as the machining center and the tool grippers are designated at the same reference numerals as those of FIGS. 1–5. The detailed explanation of these common sections or parts are omitted.

A base 31 is provided on the upper side thereof with a horizontal guide 32 which carries a first movable bed 33. The first movable bed 33 is movable between two positions by means of a hydraulic cylinder 34 or a combination of a feed screw and a motor. The first movable bed 33 is provided on the upper side thereof with a horizontal guide surface 35 extending in the direction perpendicular to the direction of movement of the first movable bed 33. The horizontal guide surface 35 carries a second movable bed 36 which is movable between two positions by a hydraulic cylinder 37 or a combination of a feed screw and a motor. A turret base 38 is fixed to the upper side of the second movable bed 36. A polygonal, substantially square in this embodiment, turret is carried for free indexing rotation around a shaft 39 which extends horizontally and in parallel with the direction of movement of the second movable bed 36. The arrangement is such that the turret 40 is indexed by a motor 41 at such a position where one of four sides of the turret 40 extends in parallel with the linear portion of the tool storage magazine 6 of the machining center. The portions of the front surface 40e adjacent to the four sides of the turret 40 constitute tool holding sections each having a plurality of tool grippers. In this embodiment, each tool holding section has three tool grippers 20a, 20b and 20c which are arrayed in a row vertical as viewed in FIG. 6 at the same pitch as the tools held in the tool storage magazine 6. The tool grippers are arranged such that the tool gripping positions are located at the outside of the turret 40 and that the axes of the gripped tools are the same or parallel with the axes of the tools stored in the linear portion of the magazine.

The operation of the tool replacement device of this embodiment, constructed as a stationary type one, will be explained hereinunder. Assume here that three tool grippers in each of the portions of the front surface of the turret 40 adjacent to the sides except one 40d grip and hold specific tools which are required in the next machining operation. The tool replacing device is situated at a predetermined position at the rear side of the tool storage magazine 6. Then, as the next workpiece is determined after the completion of the machining with a preceding workpiece, the NC controller issues a command for replacing the specific tools. In the magazine 6, the tools are arranged in such a manner as to avoid mixing of the specific tools and common tools. While the tool storage magazine is rotated and indexed to bring the specific tools to the tool replacing position B, the turret 40 is rotated clockwise as viewed in FIG. 6 by the motor 41 to bring the surface 40d having no tool to the tool replacing position. Then, the cylinder 34 operates to move the first movable bed 33 so that three tool grippers are moved ahead together with the turret in the direction perpendicular to the axes of the tools stored in the linear portion of the magazine, thereby to grip three tools simultaneously. After the gripping of the tools, the cylinder 37 operates to move the second movable bed 36 in the direction of the axes of the tools thereby to extract the latter from the magazine 6, and the cylinder 34 operates to move the first movable bed 33 thereby to convey the gripped tools to the outside of the magazine. Subsequently, the turret 40 is rotated clockwise by the motor 41 to bring the side 40a to the tool replacing position. Then, the first movable bed 33 is moved forwardly by the cylinder 34 so that the tools for replacement held by the tool grippers are aligned with the tool pots in the magazine 6 which are now vacant. The tools are then inserted to the vacant tool pots as the cylinder 37 operates to move the second movable bed 36. Subsequently, the first movable bed 33 is retracted by the cylinder 34 and the magazine is indexed to bring the next three tools to be replaced to the tool replacing position. Thereafter, the first movable bed 33 is moved ahead by the cylinder 34 to make the vacant tool grippers grip corresponding old tools. A subsequent axial movement of the second movable bed 36 in the axial direction by the cylinder 37 causes the tool grippers to extract the old tools from the tool pots of the magazine 6. Then the first movable bed 33 is retracted by means of the cylinder 34 followed by a clockwise indexing rotation of the turret 40 by the motor to bring the side 40b to the tool replacing position. Then, the same procedure is taken to replace the old tools in the magazine 6 with new tools.

Although in the illustrated embodiments the linear portion of the magazine in the tool replacing position is vertical, this may be made horizontal.

As has been described, according to the invention, the replacement of the tools in the tool storage magazine is made directly by a turret having a plurality of tool grippers in each said thereof and holding the tools for replacement, and capable of making an indexing rotation and moving in the direction of axes of the tools and in the direction perpendicular thereto.

It is, therefore, possible to replace the tools in a shorter period of time while unburdening the operator, without necessitating the use of expensive robot, thereby to achieve a high efficiency and economy in the machining center. In addition, the operation of the machining center is automated to save human labor advantageously.

Although the invention has been described through specific terms, it is to be noted here that various changes and modifications may be imparted thereto without departing from the scope of the invention which is limited solely by the appended claims.

What is claimed is:

1. In a machining center equipped with a tool storage magazine having a linear portion in which a plurality of tools are arrayed in a row at a predetermined pitch, and a tool exchanging arm by which the tool exchange is made between a machine tool and said magazine, a tool replacing device comprising:
   a turret having a plurality of tool holding sections and adapted to make an indexing rotation to bring any one of said tool holding sections to an index position adjacent to said linear portion;
   a plurality of tool grippers attached to each of said tool holding sections of said turret and adapted to grip tools in such a manner that the axes of the gripped tools extend in the same direction as the axes of the tools stored in said linear portion of said tool storage magazine and that the axes of the gripped tools are spaced from adjacent ones by the same distance as that between adjacent tools stored in said linear portion of said tool storage magazine; and
   a driving means adapted to cause a selective movement of said tool grippers in the tool holding section in said indexed position, in the direction of the axes of said gripped tools and in the direction perpendicular to the axes of said gripped tool towards and away from said linear portion of said tool storage magazine, thereby to effect a tool exchange between said tool grippers and said magazine.

2. A tool replacing device according to claim 1, characterized in that said turret is adapted to make an indexing rotation around a stationary shaft passing through the center thereof, that said driving means includes a plurality of hydraulic cylinders fixed to the end surface of the said stationary shaft and spaced by a predetermined distance from adjacent ones, and that each of said tool grippers is secured to a tool bed which is mounted on said turret, said tool bed being adapted to be moved by corresponding one of said hydraulic cylinders in said direction perpendicular to the axis of direction of the gripped tool when said tool holding section including the associated tool gripper is positioned at said indexed position opposing to said linear portion of said tool storage magazine.

3. A tool replacing device according to claim 2, wherein said turret has a polygonal shape including a plurality of sides, each of said tool holding sections being constituted by a portion of said turret adjacent to one of said sides, and wherein said tool gripper includes a pair of gripping members movable towards and away from each other and extending in the direction perpendicular to the associated side of the polygon of said turret, said gripping members being pivotally secured substantially at longitudinal mid portions thereof to the associated tool bed, and a spring acting between the rear ends of said gripping members so as to urge the front ends of said gripping members towards each other thereby to make said front ends grip a tool therebetween.

4. A tool replacing device according to claim 1, wherein said tool grippers are directly attached to said turret integrally with the latter, and said driving means is operatively connected to said turret so that said selective movement of said tool grippers is effected by operation of said driving means for directly driving said turret.

5. A tool replacing device according to claim 4, wherein said turret has a polygonal shape including a plurality of sides, each of said tool holding sections being constituted by a portion of said turret adjacent to one of said sides, and wherein said tool gripper includes a pair of gripping members movable towards and away from each other and extending in the direction perpendicular to the associated side of the polygon of said turret, said gripping members being pivotally secured substantially at longitudinal mid portions thereof to the associated tool bed, and a spring acting between the rear ends of said gripping members so as to urge the front ends of said gripping members towards each other thereby to make said front ends grip a tool therebetween.

* * * * *